(12) United States Patent
Hill

(10) Patent No.: US 6,956,475 B1
(45) Date of Patent: Oct. 18, 2005

(54) SELECTABLE LOST ITEM LOCATOR SYSTEM

(76) Inventor: Jeffrey F. Hill, 5227 Mohican Way, Antioch, CA (US) 94531

( * ) Notice: Subject to any disclaimer, the term of this patent is extended or adjusted under 35 U.S.C. 154(b) by 162 days.

(21) Appl. No.: 10/439,644

(22) Filed: May 19, 2003

(51) Int. Cl.[7] .............................................. H04Q 7/00
(52) U.S. Cl. ............................ 340/539.11; 340/539.32
(58) Field of Search ...................... 340/539.32, 825.69, 340/825.72, 539.11, 539.1, 825.49

(56) References Cited

U.S. PATENT DOCUMENTS

| 4,101,873 A | * | 7/1978 | Anderson et al. ...... 340/539.32 |
| 5,673,023 A | * | 9/1997 | Smith ......................... 340/571 |
| 5,677,673 A | * | 10/1997 | Kipnis .................... 340/539.32 |
| 5,680,105 A |   | 10/1997 | Hedrick ................... 340/539.1 |
| 5,771,002 A |   | 6/1998 | Creek et al. ........... 340/539.21 |
| 5,939,981 A | * | 8/1999 | Renney ................. 340/539.32 |
| 6,674,364 B1 | * | 1/2004 | Holbrook et al. ........ 340/568.1 |

* cited by examiner

Primary Examiner—Donnie L. Crosland

(57) ABSTRACT

A selectable lost item locator system for finding particular items either misplaced or lost. The selectable lost item locator system includes a transmitter assembly including a housing, and also including a first microprocessor and a variable radio transmitter being disposed in the housing and being connected to one another; and also includes a plurality of receiver assemblies each including a housing member, and also including a radio receiver being disposed in the housing member, and further including a sound-producing member being attached to the housing member and being connected to the radio receiver.

7 Claims, 3 Drawing Sheets

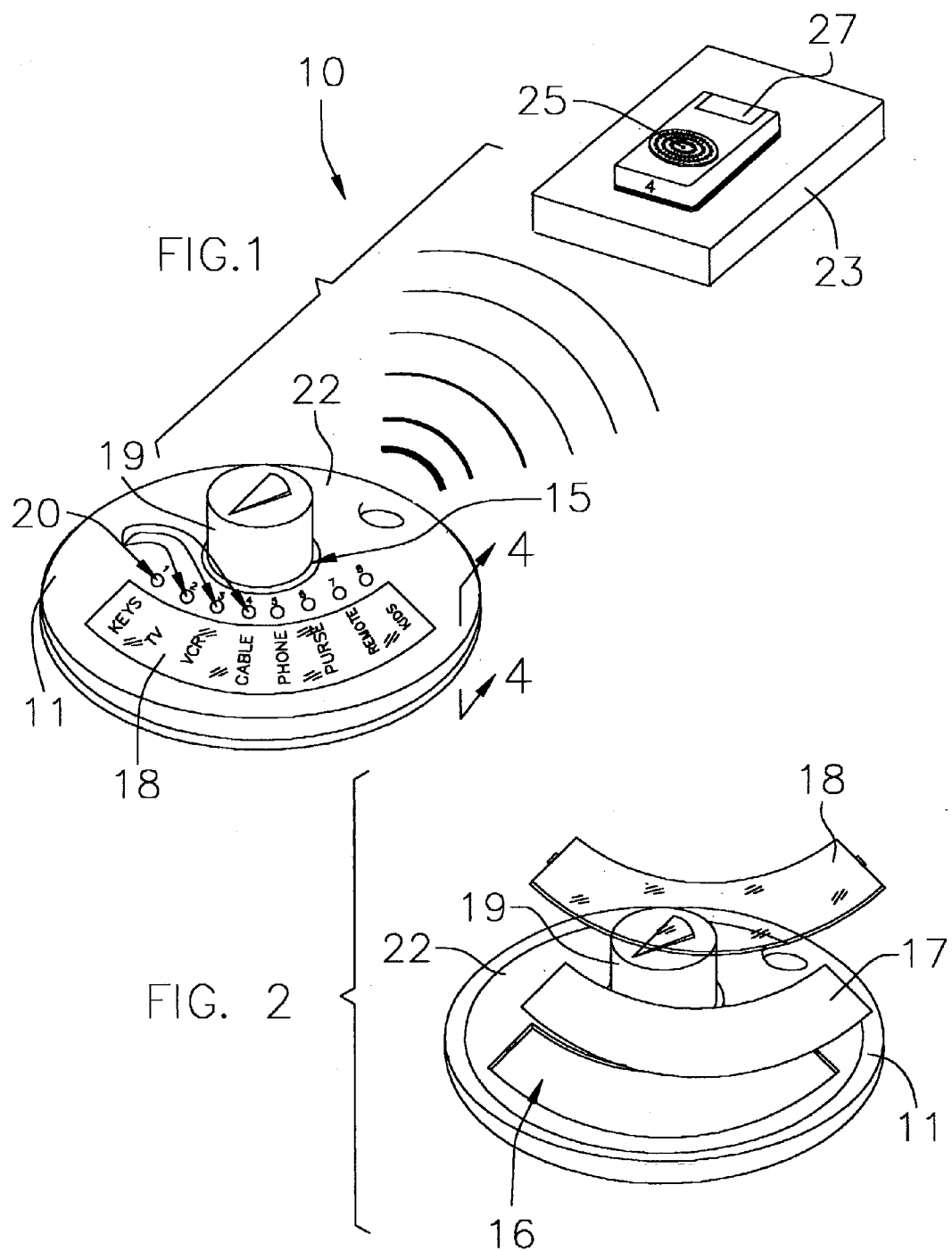

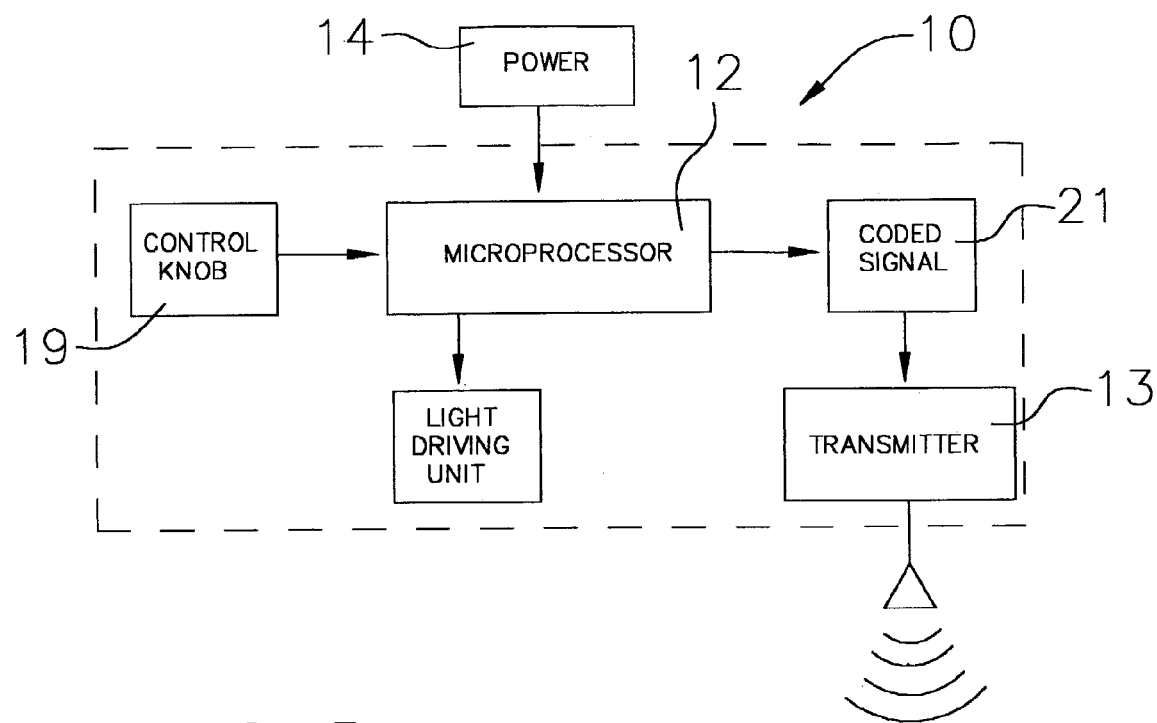
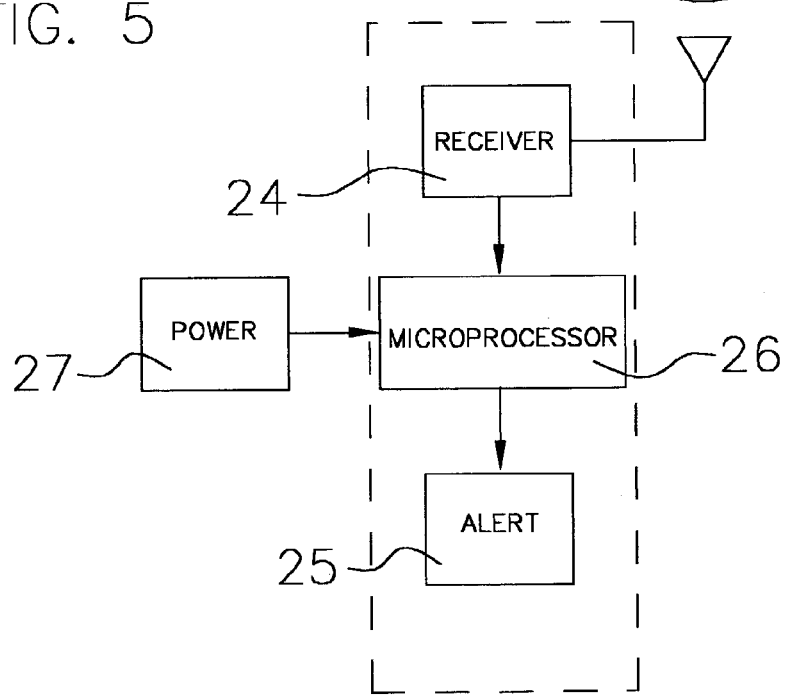
FIG. 5

SELECTABLE LOST ITEM LOCATOR SYSTEM

BACKGROUND OF THE INVENTION

1. Field of the Invention

The present invention relates to lost item locators and more particularly pertains to a new selectable lost item locator system for finding particular items either misplaced or lost.

2. Description of the Prior Art

The use of lost item locators is known in the prior art. More specifically, lost item locators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,458,097; U.S. Pat. No. 5,239,951; U.S. Pat. No. 5,746,167; U.S. Pat. No. 6,032,630; U.S. Pat. No. 5,931,125; and U.S. Patent No. Des. 440,837.

While these devices fulfill their respective, particular objectives and requirements, the aforementioned patents do not disclose a new selectable lost item locator system. The prior art includes radio transmitters and radio receivers capable of picking up signals from the radio transmitters.

SUMMARY OF THE INVENTION

The general finding particular items either misplaced or lost of the present invention, which will be described subsequently in greater detail, is to provide a new selectable lost item locator system which has many of the advantages of the lost item locators mentioned heretofore and many novel features that result in a new selectable lost item locator system which is not anticipated, rendered obvious, suggested, or even implied by any of the prior art lost item locators, either alone or in any combination thereof. The present invention includes a transmitter assembly including a housing, and also including a first microprocessor and a variable radio transmitter being disposed in the housing and being connected to one another; and also includes a plurality of receiver assemblies each including a housing member, and also including a radio receiver being disposed in the housing member, and further including a sound-producing member being attached to the housing member and being connected to the radio receiver. None of the prior art includes the combination of elements of the present invention.

There has thus been outlined, rather broadly, the more important features of the selectable lost item locator system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the finding particular items either misplaced or lost of description and should not be regarded as limiting.

It is an object of the present invention to provide a new selectable lost item locator system which has many of the advantages of the lost item locators mentioned heretofore and many novel features that result in a new selectable lost item locator system which is not anticipated, rendered obvious, suggested, or even implied by any of the prior art lost item locators, either alone or in any combination thereof.

Still another object of the present invention is to provide a new selectable lost item locator system for finding particular items either misplaced or lost.

Still yet another object of the present invention is to provide a new selectable lost item locator system that is easy and convenient to set up and use.

Even still another object of the present invention is to provide a new selectable lost item locator system that allows the user find selected items that he/she may have thought were lost or stolen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new selectable lost item locator system according to the present invention.

FIG. 2 is a perspective view of the transmitter assembly of the present invention.

FIG. 5 is a schematic diagram of the present invention.

DESCRIPTION OF THE PREFERRED EMBODIMENT

Figure 3:
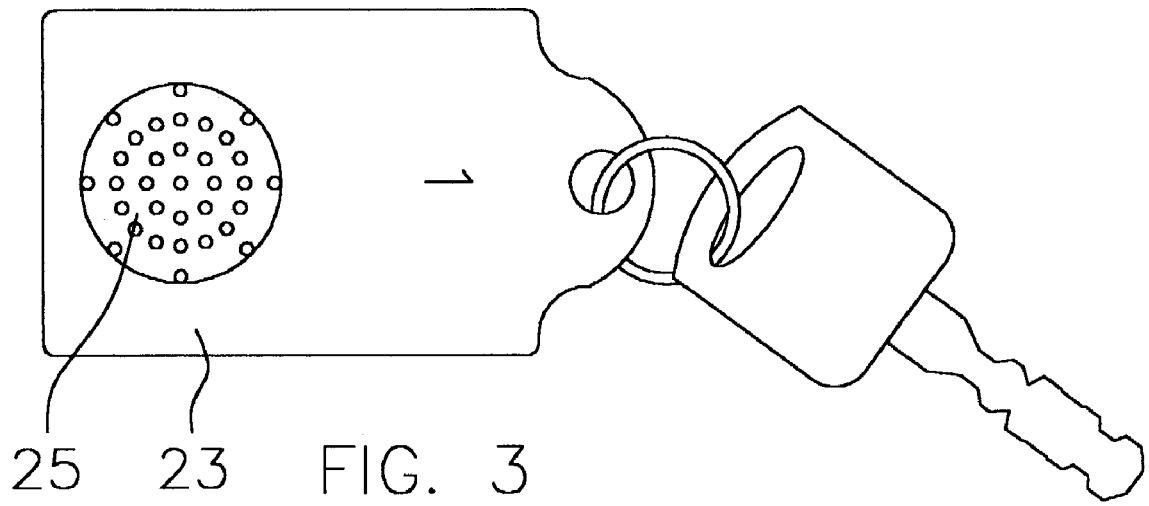
FIG. 3 is a side elevational view of one of the receiver assemblies of the present invention.
Figure 4:
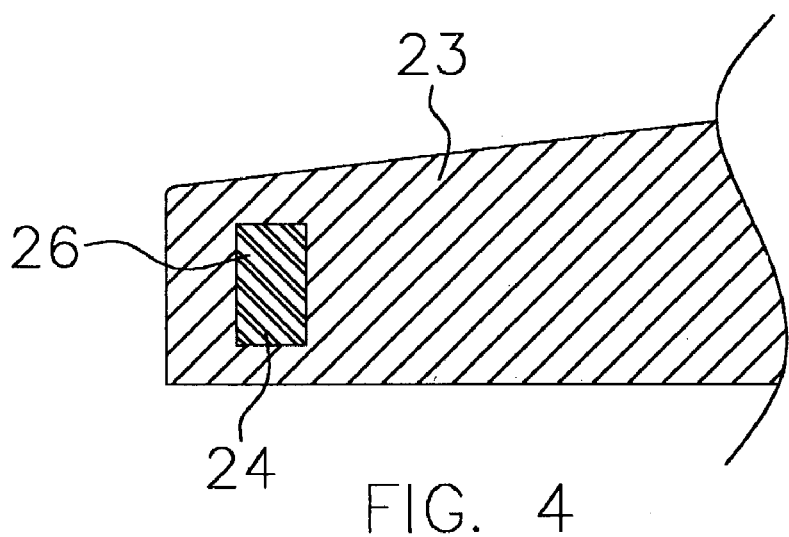
FIG. 4 is a partial cross-sectional view of the transmitter assembly of the present invention.

With reference now to the drawings, and in particular to FIGS. 1 through 5 thereof, a new selectable lost item locator system embodying the principles and concepts of the present invention and generally designated by the reference numeral 10 will be described.

As best illustrated in FIGS. 1 through 5, the selectable lost item locator system 10 generally comprises a transmitter assembly including a housing 11, and also including a first microprocessor 12 and a variable radio transmitter 13 being conventionally disposed in the housing 11 and being conventionally connected to one another. The housing 11 is generally disc-shaped having a top wall 22 and a hole 15 being centrally-disposed through the top wall 22, and also has an opening 16 being disposed near a perimeter thereof and having a selected circumferential length. The transmitter assembly further includes a plurality of light-emitting indicators 20 being conventionally disposed in the top wall 22 and being spacedly disposed along an edge of the opening 16 and being conventionally connected to the first microprocessor 12 for indicating particular frequency channels associated with particular items, and also includes a cylindrical selector dial 19 being rotatably and conventionally disposed through the hole 15 in the top wall 22 for selecting the desired frequency channels. The transmitter assembly further includes a sheet of material 17 being conventionally disposed in the opening 16 of the top wall 22 and having displayed thereupon selected named items with each selected named item being aligned with a respective one of the light-emitting members 20. The variable radio transmitter 13 includes a plurality of independent radio frequencies 21 being programmed in the first microprocessor 12. The transmitter assembly also includes a transparent cover 17 being conventionally disposed over the opening 16 in the top wall 22 and upon the sheet of material 17 for the protection thereof.

The selectable lost item locator system 10 also comprises a plurality of receiver assemblies each including a housing member 23, and also including a radio receiver 24 being conventionally disposed in the housing member 23, and further including a sound-producing member 25 being conventionally attached to the housing member 23 and being conventionally connected to the radio receiver 24. Each of the receiver assemblies further includes a second microprocessor 26 being conventionally disposed in the housing member 23, and also includes a power source 27 for energizing the second microprocessor 26 and the radio receiver 24. Each radio receiver 24 includes a unique radio frequency chip for responding to a unique frequency radio wave being transmitted by the variable radio transmitter 13. The housing members 23 include key chains, in particular.

In use, the user energizes the variable radio transmitter 13 and the first microprocessor 12 using a conventional switch mechanism, and the user rotates the cylindrical selector dial 19 to the particular item listed on the piece of material 17 with the first microprocessor 12 signaling the variable radio transmitter 13 to emit a selected radio frequency 21 that is received by the radio receiver 24 connected to the particular item being searched for upon which, a sound is emitted by the sound-producing member 25 so that the user can track down where the sound is coming from to locate the particular item.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the selectable lost item locator system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A selectable lost item locator system comprising:

a transmitter assembly including a housing, and also including a first microprocessor and a variable radio transmitter being disposed in said housing and being connected to one another, said housing being generally disc-shaped having a top wall and a hole centrally-disposed through said top wall, and also having an opening being disposed near a perimeter thereof and having a pre-determined circumferential length, said transmitter assembly further including a plurality of light-emitting indicators being disposed in said top wall and being spacedly disposed along an edge of said opening and being connected to said first microprocessor for indicating particular frequency channels associated with particular items, and also including a selector dial being rotatably disposed through said hole in said top wall for selecting the desired frequency channels; and a plurality of receiver assemblies each including a housing member, and also including a radio receiver being disposed in said housing member, and further including a sound-producing member being attached to said housing member and being connected to said radio receiver.

2. A selectable lost item locator system as described in claim 1, wherein said transmitter assembly further includes a sheet of material being disposed in said opening of said top wall and having displayed thereupon selected named items with each said selected named item being aligned with a respective one of said light-emitting members.

3. A selectable lost item locator system as described in claim 2, wherein said variable radio transmitter includes a plurality of independent radio frequencies programmed in said first microprocessor.

4. A selectable lost item locator system as described in claim 3, wherein said transmitter assembly also includes a transparent cover being disposed over said opening in said top wall and upon said sheet of material.

5. A selectable lost item locator system as described in claim 4, wherein each of said receiver assemblies further includes a second microprocessor being disposed in said housing member, and also includes a power source for energizing said second microprocessor and said radio receiver.

6. A selectable lost item locator system as described in claim 5, wherein each said radio receiver includes a unique radio frequency chip for responding to a unique frequency radio wave being transmitted by said variable radio transmitter.

7. A selectable lost item locator system as described in claim 6, wherein said housing members includes key chains, in particular.

* * * * *